(12) United States Patent
Gorog et al.

(10) Patent No.: US 8,510,135 B1
(45) Date of Patent: Aug. 13, 2013

(54) INSURANCE PRODUCT

(75) Inventors: Regina K. Gorog, Houston, TX (US);
Elliot C. Gorog, Houston, TX (US);
Garland Levit, Houston, TX (US);
Donald N. Levit, Sugar Land, TX (US)

(73) Assignee: MSFS, LLC, Houston, TX (US)

( * ) Notice: Subject to any disclaimer, the term of this patent is extended or adjusted under 35 U.S.C. 154(b) by 0 days.

(21) Appl. No.: 13/356,025

(22) Filed: Jan. 23, 2012

(51) Int. Cl.
*G06Q 40/00* (2012.01)

(52) U.S. Cl.
USPC .................................. 705/4; 705/30

(58) Field of Classification Search
USPC ........................................ 705/3–44
See application file for complete search history.

(56) References Cited

U.S. PATENT DOCUMENTS

| | | | | |
|---|---|---|---|---|
| 5,911,136 | A * | 6/1999 | Atkins | 705/36 R |
| 7,630,899 | B1 * | 12/2009 | Brown et al. | 704/270.1 |
| 7,877,314 | B2 * | 1/2011 | Avery | 705/37 |
| 8,078,508 | B1 * | 12/2011 | Shieh et al. | 705/30 |
| 8,195,536 | B2 * | 6/2012 | Suh | 705/30 |
| 8,271,301 | B1 * | 9/2012 | Nordyke et al. | 705/4 |
| 8,396,725 | B2 * | 3/2013 | Stockton et al. | 705/4 |
| 2002/0128877 | A1 | 9/2002 | Levit | |
| 2007/0038481 | A1 * | 2/2007 | Darr | 705/4 |
| 2008/0167903 | A1 * | 7/2008 | Hall et al. | 705/4 |
| 2009/0024478 | A1 * | 1/2009 | Dixon et al. | 705/14 |
| 2009/0112634 | A1 * | 4/2009 | Koziol | 705/4 |
| 2010/0094667 | A1 * | 4/2010 | Darr | 705/4 |
| 2011/0119095 | A1 * | 5/2011 | Mercier et al. | 705/4 |
| 2012/0041790 | A1 * | 2/2012 | Koziol | 705/4 |

* cited by examiner

*Primary Examiner* — Frantzy Poinvil
(74) *Attorney, Agent, or Firm* — Greenblum & Bernstein, P.L.C.

(57) ABSTRACT

A method of determining an insurance coverage amount for an insurance plan holder having a health insurance plan using a tangible computer processor, as well as a related system and a non-transitory tangible computer readable storage medium, are provided. The method may include receiving a contribution payment amount from the insurance plan holder, the contribution payment amount including at least an investment payment portion and a premium payment portion, distributing, using the tangible computer processor, the investment payment portion and the premium payment portion between an investment account and a premium account, respectively, and determining, after the distributing, the insurance coverage amount based on an amount of funds present in the investment account and a coverage factor for a predetermined time period.

13 Claims, 4 Drawing Sheets

INSURANCE PRODUCT

BACKGROUND

1. Field of the Disclosure

The present disclosure relates to the field of insurance products. More particularly, the present disclosure relates to a system, a method and a non-transitory tangible computer readable storage medium for determining an insurance coverage amount for an insurance plan holder having a health insurance plan.

2. Background Information

For various reasons and circumstances, adequate health insurance coverage can be difficult to obtain for many Americans. Additionally, many low income families and young workers may not have the financial means to afford meaningful health insurance coverage without sacrificing other necessities (e.g., food, clothing, shelter). As a result, these individuals and families cannot save as much of their income and purchase other resources. Thus, individuals and families may find themselves having to decide whether or not to forego maintaining health insurance coverage altogether, and there is a negative effect on the overall health system's well-being because of these uninsureds' liabilities.

For at least the foregoing reasons, there is a need for a health insurance product that enables individuals and families to protect themselves with not only meaningful health insurance coverage that adequately covers them in the case of an emergency, sickness, physical ailment, serious potential health concerns, and/or untimely illness but also provides meaningful, long term and affordable health insurance coverage.

Further, there is a need to increase the flexibility of health insurance plans so that individuals and families retain even more control and affordability over their health insurance coverage and costs.

SUMMARY OF THE INVENTION

In view of the foregoing, the present disclosure, through one or more of its various aspects, embodiments and/or specific features or sub-components, is thus intended to bring out one or more of the advantages as specifically noted below.

According to an aspect of the present disclosure, a method determines an insurance coverage amount for an insurance plan holder having a health insurance plan, using a tangible computer processor. The method may include receiving a contribution payment amount from the insurance plan holder, the contribution payment amount including at least an investment payment portion and a premium payment portion, distributing, using the tangible computer processor, the investment payment portion and the premium payment portion between an investment account and a premium account, respectively, and determining, after the distributing, the insurance coverage amount based on an amount of funds present in the investment account and a coverage factor for a predetermined time period.

According to another aspect of the present disclosure, the method may include determining whether a claim for insurance has been received, the claim for insurance having a claim amount, wherein when the claim is received, the amount of funds in the investment account is decreased, and the insurance coverage amount is updated based on a product of the decreased amount of funds and the coverage factor.

According to yet another aspect of the present disclosure, the method may include decreasing the amount of funds in the investment account based on a difference between the amount of funds in the investment account and a deduction factor, the deduction factor being a quotient of the claim amount of the claim and the coverage factor.

According to still another aspect of the present disclosure, the method may include setting a predetermined coverage indicator for the insurance coverage amount, and determining a cost of reinsurance for the predetermined time period based on a difference between the determined insurance coverage amount and the predetermined coverage indicator, the cost of reinsurance being a component of the premium payment portion.

According to a further aspect of the present disclosure, when the difference between the determined insurance coverage amount and the predetermined coverage indicator decreases between each successive, predetermined time period, the method may include alerting an account manager for receiving updates to the health insurance plan to decrease the cost of reinsurance and reduce the premium payment portion due for a subsequent time period.

According to an aspect of the present disclosure, when the difference between the determined insurance coverage amount and the predetermined coverage indicator is zero for the predetermined time period, the method may include alerting the account manager for receiving updates to the health insurance plan, and wherein when the health insurance plan is updated, a reduced contribution payment is received where at least one of the investment payment portion and the premium payment portion is decreased.

According to another aspect of the present disclosure, when the reduced contribution payment amount is received for distribution between the investment account and the premium account, a supplemental insurance coverage amount is determined based on an amount of funds present in the investment account and a supplemental coverage factor.

According to yet another aspect of the present disclosure, the coverage factor is variable and based on information received from at least one insurance risk database.

According to still another aspect of the present disclosure, the method may include receiving in the investment account an interest amount based on the amount of funds in the investment account and a percentage of variable interest for a variable, predetermined time period.

According to an aspect of the present disclosure, the predetermined coverage indicator is based on a catastrophic insurance plan, and wherein the catastrophic insurance plan is a rider to the health insurance plan.

According to yet another aspect of the present disclosure, the supplemental coverage factor is variable and based on information received from at least one insurance risk database.

According to still another aspect of the present disclosure, a system determines an insurance coverage amount for an insurance plan holder having a health insurance plan. The system may include a receiver configured to receive a contribution payment amount from the insurance plan holder in a communication over a communications network, the received contribution payment amount including at least an investment payment portion and a premium payment portion, an account data processor that communicates with the receiver and configured to match the received contribution payment amount to the health insurance plan, a distributor that communicates with the receiver and the account data processor, and is configured to receive the contribution payment amount and distribute the investment payment portion and the premium payment portion between an investment account and a premium account associated with the health insurance plan, respectively, a determining processor that monitors an amount of funds present in the investment account and determines the insurance coverage amount based on the amount of funds present in the investment account and a coverage factor for a predetermined time period and an outputter that displays the determined insurance coverage amount.

According to a further aspect of the present disclosure, at least one non-transitory tangible computer readable storage medium stores a computer program for determining an insurance coverage amount for an insurance plan holder having a health insurance plan. The tangible computer readable storage medium may include a receiving code segment, recorded on the tangible computer readable storage medium, executable to receive a contribution payment amount from the insurance plan holder in a communication over a communications network, the received contribution payment amount including at least an investment payment portion and a premium payment portion, a processing code segment processor, recorded on the tangible computer readable storage medium, executable to match the received contribution payment amount to the health insurance plan, a distributing code segment, recorded on the tangible computer readable storage medium, executable to distribute the investment payment portion and the premium payment portion between an investment account and a premium account, respectively, a computing code segment, recorded on the tangible computer readable storage medium, executable to determine the insurance coverage amount based on an amount of funds present in the investment account and a coverage factor for a predetermined time period, the coverage factor being, and an output code segment, recorded on the tangible computer readable storage medium, executable to display the determined insurance coverage amount.

DETAILED DESCRIPTION

Figure 1:
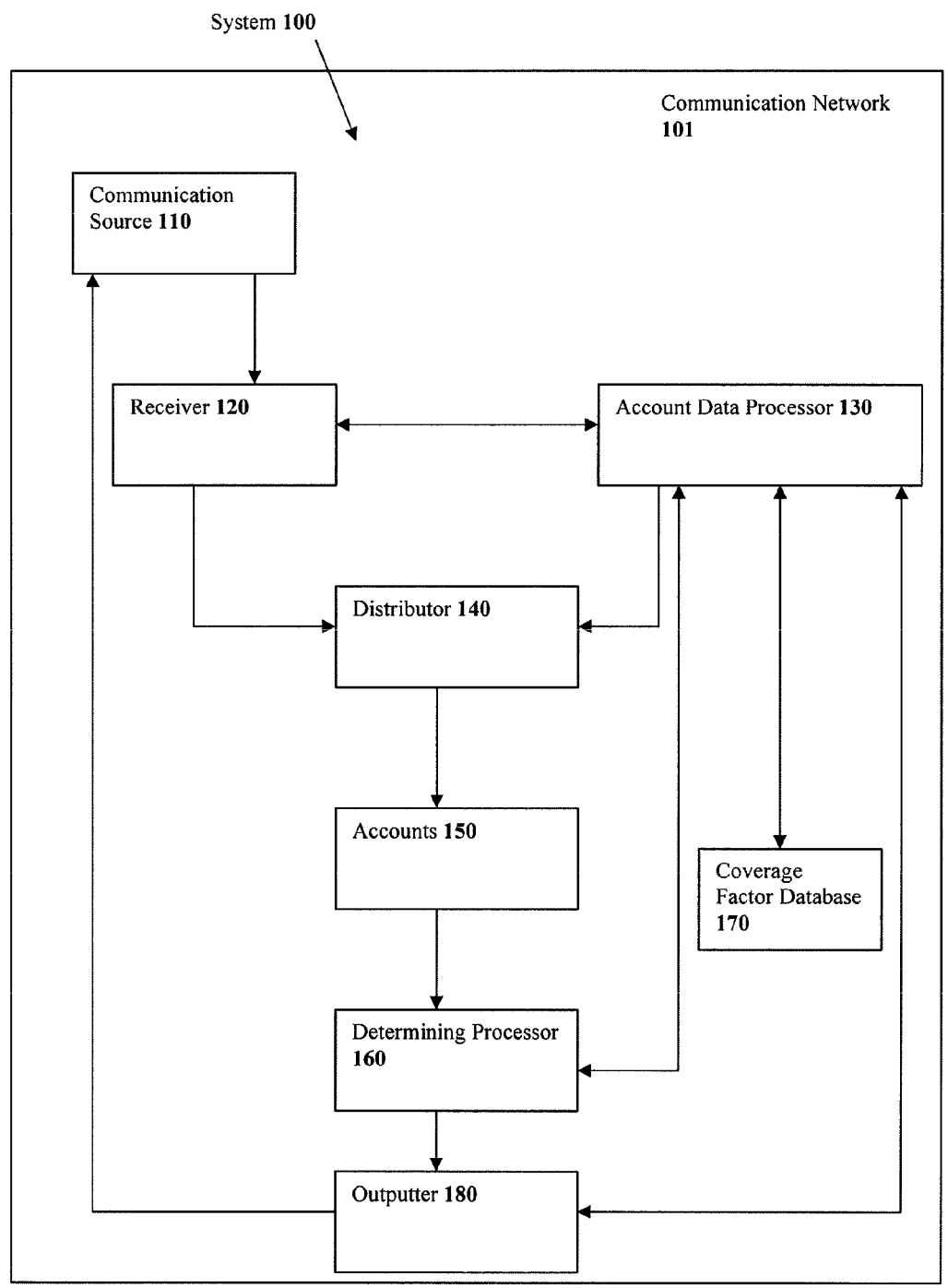
FIG. 1 illustrates an exemplary system to determine an insurance coverage amount for an insurance plan holder having a health insurance plan, according to an aspect of the present disclosure.

FIG. 1 illustrates an exemplary system 100 to determine an insurance coverage amount for an insurance plan holder (also referred herein as the "insured") having a health insurance plan, according to an aspect of the present disclosure. The system 100 functions in a communications network 101. The system may embody a standalone computer device or it may be connected to other computer devices and peripherals within the communications network 101. The system 100 may be utilized by an insurer offering the health insurance plan although it is contemplated that any insurer associated with any aspect of the health insurance plan may also utilize system 100.

As shown in the non-limiting embodiment of FIG. 1, the system includes a receiver 120 configured to receive a contribution payment amount from a communication source 110 in a communication over the communication network 101. The communication source 110 may be a computer, a mobile phone, a website or other peripheral device capable of sending and receiving electronic and/or audible communications with the receiver 120. The receiver 120 is configured to receive an electronic transfer of funds during a communication with the communication source 110, as well as capable of receiving intake information for receiving funds simultaneously or at a later time. In this regard, it is contemplated that an insurance plan holder may have several options for making monthly health insurance payments.

For example, such payments can be made via a mobile phone application (or "app") to the receiver 120 within the system 100, via a website on a desktop computer, via a telephone call where, for example, credit card information is given over the call (either audibly or by tactile function), or any other readily known method of electronic payment within the communication network 101.

The system 100 also includes an account data processor 130 that communicates with the receiver 120 and is configured to identify the health insurance plan and the insurance plan holder with the received contribution payment amount. For example, when an insurance plan holder makes a payment to the insurer, the receiver 120 is configured to receive the payment and simultaneously associates the incoming payment with the plan and the plan holder. In embodiments, the account data processor 130 may be a part of the receiver 120.

The system 100 further includes a distributor 140 that communicates with the receiver 120 and the account data processor 130, and is configured to receive the contribution payment amount, to identify the contribution payment amount as including an investment payment portion and a premium payment portion, and to distribute the investment payment portion and the premium payment portion between at least an investment account and a premium account, respectively (see accounts 150). The distributor 140 may be a processor.

In embodiments, the investment account may be a savings account capable of tax deferred growth, capable of generating interest on the investment amount within the account, as well as capable of allowing the insured to withdraw funds from the account. Further, the distributor 140 communicates with the account data processor 130 to determine how much of the contribution payment amount is allocated as the investment payment portion and as the premium payment portion. In this regard, it is noted that the investment payment portion amount and the premium payment portion amount may vary for any given payment period, as will be discussed in detail below.

The system includes a determining processor 160 that communicates with the accounts 150 and the account data processor 130. According to embodiments, the determining processor 160 is configured to monitor an amount of funds present in the investment account and to determine an insurance coverage amount based on the amount of funds present in the investment account and a coverage factor for a predetermined time period.

In embodiments, the coverage factor is received from a coverage factor database 170, which may be in communication with one or both of the account data processor 130 and the determining processor 160. The coverage factor is determined by the insurer on a reoccurring basis and may be based on various financial factors set by the insurer including, but not limited to, market conditions, expected new customers purchasing and entering into new plans in a group, customers exiting plans in the group, claims paid, cash available, cash reserves, interest growth credited in the plan holder's investment accounts, the plan holders' surrender values in the group and various other actuarial means. It is noted that this listing has been provided for illustration purposes; however, the listing is not exhaustive and the coverage factor may be based on other factors and considerations know to those of ordinary skill throughout the insurance industry (e.g., auto, health, homeowners, and life insurance).

The determining processor 160 also communicates with the account data processor 130 to determine whether a claim for insurance by the insurance plan holder has been received and to update the insurance plan holder's account data. If a claim for insurance has been received by the account data processor 130, the determining processor 160 is configured to communicate with the accounts 150 to decrease the amount of funds in the investment account and to determine an insurance coverage amount based on the reduced amount of funds present in the investment account and the coverage factor for a predetermined time period.

With respect to updating the account data, the determining processor 160 is further configured to send updated information to the account data processor 130 regarding the amount of funds in the investment account and an updated insurance coverage amount.

It is contemplated that the determining processor 160 is also configured to compare and statistically analyze changes in the investment account, changes in the coverage factor, and changes in the determined insurance coverage amounts across multiple time periods for purposes of, e.g., identifying trends of insurance plan holders, to monitor system robustness, and to improve overall system performance.

The system also includes an outputter 180 that is configured to communicate with the determining processor 160, the communication source 110 and the account data processor 130. In embodiments, the outputter 180 is configured to display the determined insurance coverage amount, along with other optional information about the plan, which may include, but is not limited to, display of the amount in the investment account, display of the amount allocated to the investment payment portion and the premium payment portion, display of the next premium payment due date and contribution payment portion, as well as display of the plan number.

In further embodiments, the outputter 180 may communicate with the communication source 110 so that the communication source 110 displays the determined insurance coverage amount, as well as any of the above-noted optional information. For example, the outputter 180 may indicate the determined insurance coverage via an email communication on a computer system, a text message received by a mobile phone, an audio recording delivered through a telephone associated with the insurance plan holder, as well as a facsimile/copier/printer print-out or any other electronic device capable of receiving an electronic communication for display.

It is further noted that the outputter 180 does not necessarily communicate with the same communication source that communicates with the receiver 120 to receive a contribution payment amount from a communication source 110. In this regard, depending on the preference of either the insurer and/or the insured, the outerputter 180 may communicate with a different communication source.

For example, it is contemplated that the insured may authorize the transfer of a contribution payment amount via a mobile phone application (i.e., the initial communication source). However, when the updated insurance coverage amount is determined, the outputter 180 may be configured to communicate the coverage amount via an email displayed on, e.g., a home computer (i.e., a communication source different than the initial communication source).

The outputter 180 may also communicate with the account data processor 130 so that the account data processor 130 may store the information determined by the determining processor 160. Alternatively, the determining processor 160 may directly communicate the determined information to the account data processor 130 (alone or simultaneously while communicating with the outputter 180).

Figure 2:
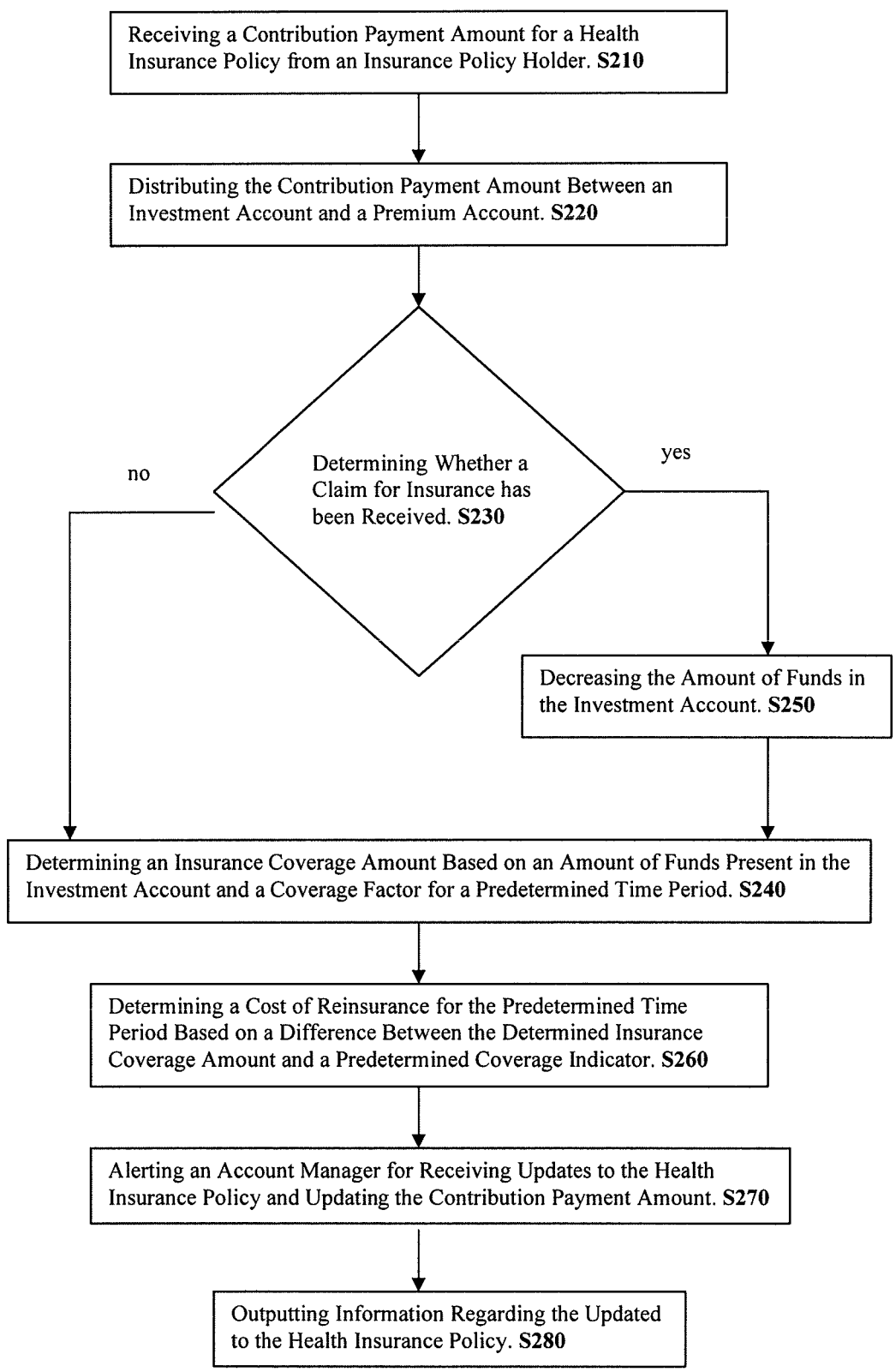
FIG. 2 is a flowchart depicting an exemplary method of determining an insurance coverage amount for an insurance plan holder having a health insurance plan, according to an aspect of the present disclosure.

FIG. 2 is a flowchart depicting an exemplary method of determining an insurance coverage amount for an insurance plan holder having a health insurance plan, according to an aspect of the present disclosure.

The system 100 in the communication network 101 may perform the method as shown. In addition to system 100, any disclosed method or step described herein may be performed by a computer having a processor and a memory. Specifically, in S210 the method includes receiving a contribution payment amount from the insurance plan holder. This method may be performed by the receiver 120 and the account data processor 130. In S220, the received contribution payment amount is identified as an investment payment portion and a premium payment portion and is distributed between an investment account and a premium account, respectively. These methods may be performed by the account data processor 130, the distributor 140 and the accounts 150.

For example, an individual signs up for a health insurance plan with an insurer. It is determined that the insured will initially contribute $120 a month, and that $20 dollars represents the monthly premium payment portion and $100 dollars represents the monthly investment payment portion.

It is noted that the cost of insurance is determined by various factors including, but not limited to, an amount of coverage built through investment contributions, a cost of reinsurance based on the amount of coverage built up over time, a cost of a coverage factor (a multiple of coverage) offered for the plan, a cost for a catastrophic health insurance plan (e.g., a high deductible health insurance plan) to compliment the plan and any minimum insurance administrative costs charged by the insurer including maintenance fees, administrative fees, charges for vendor and agent commissions to be paid out, etc.

The method of determining the insurance coverage amount for the insurance plan holder continues with S230 in which the system determines, after distribution of the contribution payment amount, whether a claim for insurance has been received by the system in at least one of the receiver 120 and the account data processor 130.

When no claim has been received, in S240 the insurance coverage amount is determined based on an amount of funds present in the investment account 150 and a coverage factor for a predetermined time period. These methods may be performed by the account data processor 130, the determining processor 160, and the coverage factor database 170.

The coverage factor may be determined on a reoccurring basis based on, e.g., the insurer's financials, reserves, expected claims, expected surrenders of existing plans within a group, expected earnings on the accounts, expected new customers purchasing and entering into new plans in the group, customers exiting plans in the group and various other actuarial means.

For example, assume that the insurer offers a coverage factor of 3, that an initial investment payment portion of $100 is received in the investment account 150 (in month 1), and no claim has been received. In such a scenario, in S240, the determining processor 160 determines that the insured has an insurance coverage amount of $400 ($100 contribution+ ($100 contribution×3).

In addition, because the investment account may be a savings account, interest may be earned as well, and the insurance coverage amount may be adjusted to account for the same. As illustrated, every predetermined time period (e.g., every premium payment cycle) that passes (and so long as no claim is made) the insured's insurance coverage grows.

When a claim has been received by the system 100, the amount of funds in the investment account 150 is decreased in S250, and the insurance coverage amount is updated. The amount decrease of funds in the investment account is based on a difference between the amount of funds in the investment account 150 and a deduction factor, where the deduction factor is a quotient of the claim amount of the claim and the coverage factor, and the updated insurance coverage amount is based on a product of the decreased amount of funds in the investment account 150 and the coverage factor.

Thus, when a claim has been received, in S240 the insurance coverage amount is determined based on a reduced amount of funds present in the investment account 150 and the coverage factor for the predetermined time period. These methods may also be performed by the account data processor 130, the determining processor 160, and the coverage factor database 170.

For example, assume the investment account 150 has accumulated $12,500 of value and the insurer provides a coverage factor of 4. If in S230 no claim is received by either the receiver 120 or the account data processor 130, in S240 it is determined that the insured has an insurance coverage amount of $50,000 ($12,500×4).

On the other hand, if in S230 a claim of $4,000 is received by either the receiver 120 or the account data processor 130, in S250 the determining processor 160 decreases the amount of funds in the investment account 150 to $11,500 based on the calculated deduction factor ($4000/4=$1,000). As a result, in S240 the determining processor 160 further determines that the insured's updated insurance coverage amount is $46,000 ($11,500×4).

In S260, the system 100 determines a cost of reinsurance (which is a component of the premium payment portion) for the predetermined time period based on a difference between the determined insurance coverage amount and a predetermined coverage indicator, which is an amount determined based on various factors discussed below. The predetermined coverage indicator may be stored in the account data processor 130 and communicated to the determining processor 160 when the cost of reinsurance is being determined.

In embodiments, the predetermined coverage indicator may be an amount based on a catastrophic health insurance plan, attached as a rider to the insured's health insurance plan. Thus, including the cost of reinsurance in the premium payment portion enables the insured to fill in temporary "gaps" in coverage between the determined insurance coverage amount and a catastrophic plan coverage amount (e.g., a high deductible insurance plan coverage amount). In other words, if a claim having an amount that exceeds the actual insurance coverage of the plan holder is made, the insured can cover the "gap" in coverage because the cost of reinsurance is factored into the premium payment.

Figure 3:
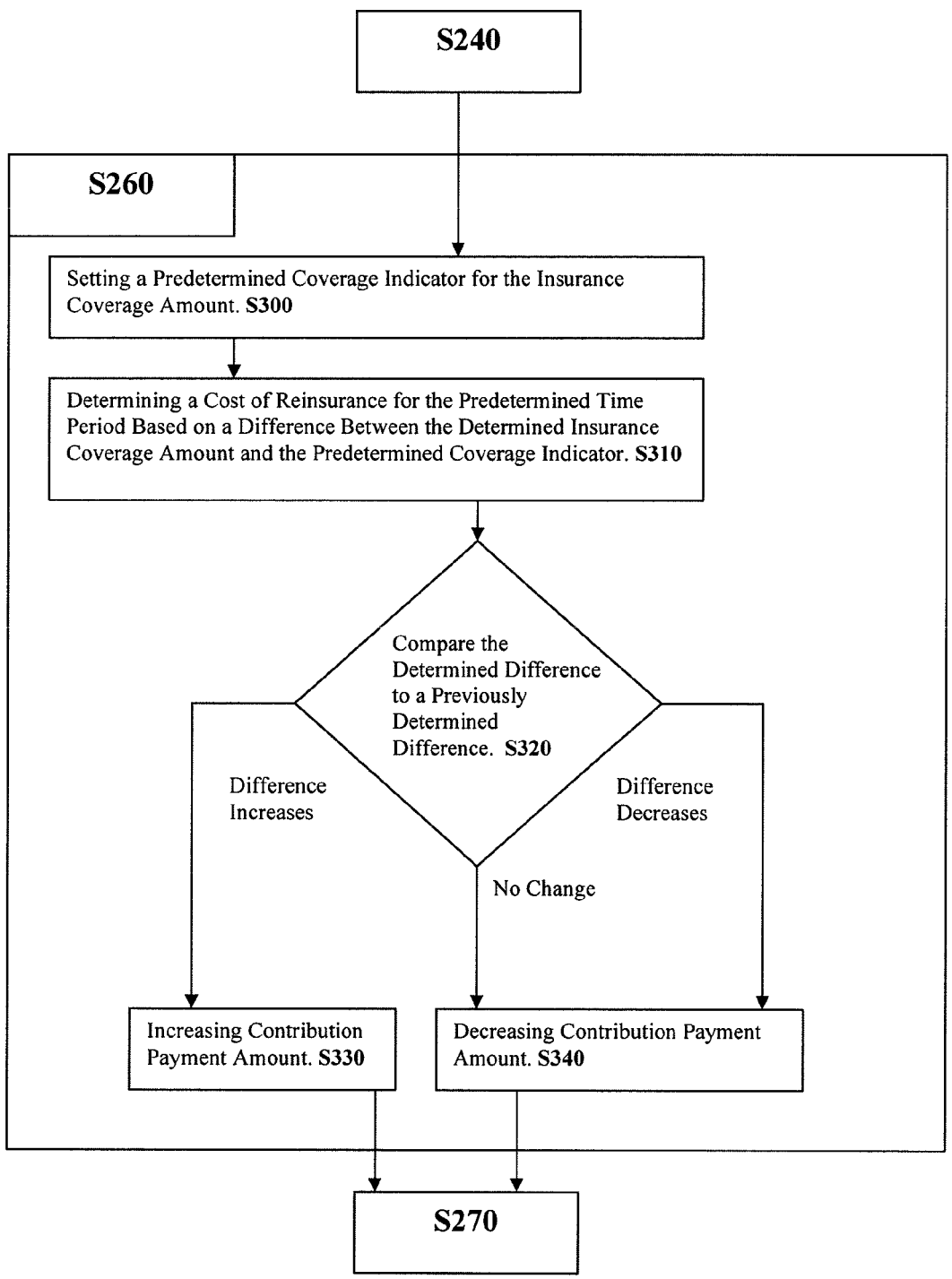
FIG. 3 is a flowchart depicting the exemplary method of FIG. 2, according to another aspect of the present disclosure.

FIG. 3 shows an expanded view of S260 and determining the cost of reinsurance. In particular, in S300 the method includes setting the predetermined coverage indicator for the insurance coverage amount so that the cost of reinsurance can be determined based on the difference between the determined insurance coverage amount and the predetermined coverage indicator in S310.

For example, assume the determining processor 160 has determined an insurance coverage amount of $46,000 and the health insurance plan includes as a rider a catastrophic health insurance plan where the predetermined coverage indicator is $50,000. In S310, the determining processor 160 determines a cost of reinsurance based on a difference between the $46,000 of coverage and the $50,000 predetermined coverage indicator. Thus, the determined cost of reinsurance is based on a "gap" in coverage of $4000.

In S320, the determining processor 160 compares the difference between the determined insurance coverage amount and the predetermined coverage indicator with a previously determined difference between the two amounts. When the difference between the determined insurance coverage amount and the predetermined coverage indicator increases between each successive, predetermined time period (e.g., when a claim has been made and the investment account amount has been decreased), the method continues to S330 where the determining processor 160 determines that the premium payment portion should be increased based on an increase in the determined cost of reinsurance. An account manager is alerted in S270 for receiving updates to the health insurance plan to at least increase the cost of reinsurance and increase the premium payment portion for the next payment cycle.

It is noted that the account manager may be provided at (or may be a part of) the account data processor 130 and that any updates made to the plan are saved and stored in the same. In addition, when it is determined that the premium payment should be increased the account manager may be configured to automatically update the health insurance plan or it may alert an administrator that changes to the plan should be made or that the insured should be consulted prior to any change to the plan.

For example, assume the determining processor 160 had previously determined an insurance coverage amount of $46,000 and the health insurance plan includes as a rider a catastrophic insurance plan where the predetermined coverage indicator is $50,000. In S310, the determining processor 160 determines a cost of reinsurance based on a $4,000 "gap" in coverage. If the insured then makes a claim (that is identified during the next payment cycle) that reduces the insurance coverage amount to $40,000, then in S320, the determining processor 160 compares the present difference ($10,000) between the determined insurance coverage amount ($40,000) and the predetermined coverage indicator ($50,000) with the previously determined difference ($4,000). Because the difference between the determined insurance coverage amount and the predetermined coverage indicator has increased since the previous payment cycle, the method continues to S330 where the determining processor 160 determines that the premium payment portion should be increased based on an increase in the determined cost of reinsurance.

The method continues in S270 where the account manager is alerted for receiving updates to the health insurance plan based on the determined increase. It is noted that because the health insurance plan provides for more control by the insurance plan holder, the insurance plan holder may decide that it may be more cost effective to assume the risk of the "gap" in coverage and thus not authorize an increased premium payment based on the increased cost of reinsurance.

When the difference between the determined insurance coverage amount and the predetermined coverage indicator decreases between each successive, predetermined time period, the method continues to S340 where the determining processor 160 determines that the premium payment portion should be decreased. Here the account manager is alerted in S270 for receiving updates to the health insurance plan to at least decrease the cost of reinsurance and thus reduce the premium payment portion. Again, the account manager may be configured to automatically update the health insurance plan or it may alert an administrator that changes to the plan should be made or that the insured should be consulted to authorize any change to the plan not previously agreed upon.

For example, assume the determining processor 160 had previously determined an insurance coverage amount of $46,000 and the health insurance plan includes as a rider a catastrophic insurance plan where the predetermined coverage indicator is $50,000. In S310, the determining processor 160 determines a cost of reinsurance based on a $4,000 "gap" in coverage. If during the next payment cycle, no claim is made and the insured contributes an investment payment portion that increases the insurance coverage amount to $46,500, then in S320, the determining processor 160 compares the present difference ($3,500) between the determined insurance coverage amount ($46,500) and the predetermined coverage indicator ($50,000) with the previously determined difference ($4,000). Because the difference between the determined insurance coverage amount and the predetermined coverage indicator has decreased since the previous payment cycle, the method continues to S340 where the determining processor 160 determines that the premium payment portion should be decreased based on a decrease in the determined cost of reinsurance. The method continues in S270 where the account manager is alerted for receiving updates to the health insurance plan based on the determined decrease.

When the difference between the determined insurance coverage amount and the predetermined coverage indicator is zero for the predetermined time period, the method continues to S340 where the determining processor 160 determines that the premium payment portion should be decreased since there is no difference between the determined insurance coverage and the predetermined coverage indicator.

At S270, the account manager is alerted for receiving updates to the health insurance plan to decrease the premium payment portion for the next payment cycle. In this scenario (where the difference is zero) the insurance plan holder may only have to pay the minimum administrative fees as their premium payment to keep the plan in force. It is also noted that additional contributions to the investment account (once the determined insurance coverage amount equals the predetermined coverage indicator) may serve as the "gap" filler should a claim be made in which the value in the investment account falls below the predetermined coverage indicator.

It is further noted that in any of the above scenarios (where the difference increases, decreases or is zero), the account data processor 130 may communicate with the outputter 180 to indicate to the insured (via communication source 110) that a decision and a specified action is required by the insured for updating the health insurance plan.

In embodiments, when it is determined in S320 and S340 that the difference between the determined insurance coverage amount and the predetermined coverage indicator is zero for a successive predetermined time period, and when the updated contribution payment amount is received by the receiver 120 and sent through the distributor 160 for distribution between the investment account and the premium account, in S240 the determining processor 160 determines a supplemental insurance coverage amount based on an amount of funds present in the investment account and a supplemental coverage factor.

In this scenario, the supplemental coverage factor is variable and may be the same or different from the coverage factor for any given time period. In addition, the supplemental coverage factor may be applied only to the portion of the amount of funds in the investment account greater than the predetermined coverage indicator. Thus, the supplemental insurance coverage amount may be based on the predetermined coverage indicator and a product of the portion of the amount of funds in the investment account greater than the predetermined coverage indicator and the supplemental coverage factor.

Returning to FIG. 2, when the health insurance plan is updated in S270, information regarding the updates is outputted in S280. As noted above, these methods may be performed by the communication source 110, the account data processor 130 and the outputter 180 and the output may come in the form of an electronic communication (e.g., email, text message, webpage), an audio message, and a print-out (e.g., via a printer and facsimile).

Figure 4:
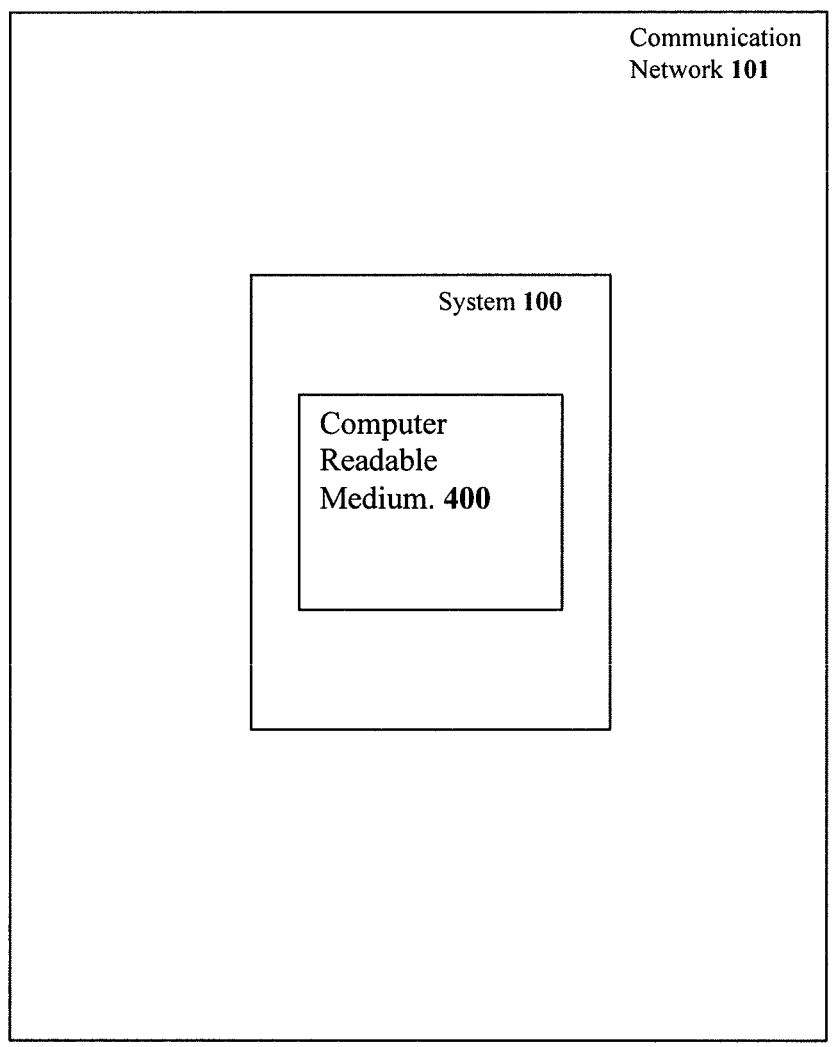
FIG. 4 illustrates a tangible computer readable medium that stores a computer program for determining an insurance coverage amount for an insurance plan holder having a health insurance plan and can be implemented in the exemplary system of FIG. 1, according to an aspect of the present disclosure.

FIG. 4 depicts the system 100 including a computer readable medium 400 within the communication network 101. The computer readable medium 400 can include a set of instructions that can be executed to cause the system 100 to perform any one or more of the methods disclosed for determining an insurance coverage amount for an insurance plan holder having a health insurance plan.

Specifically, the computer readable medium 400 at least stores a computer program for determining an insurance coverage amount for an insurance plan holder having a health insurance plan, and includes a receiving code segment executable to receive a contribution payment amount from the insurance plan holder in a communication over a communications network, the received contribution payment amount including at least an investment payment portion and a premium payment portion, a processing code segment processor executable to match the received contribution payment amount to the health insurance plan, a distributing code segment executable to distribute the investment payment portion and the premium payment portion between an investment account and a premium account, respectively, a computing code segment executable to determine the insurance coverage amount based on an amount of funds present in the investment account and a coverage factor for a predetermined time period, the coverage factor being, and an output code segment executable to display the determined insurance coverage amount.

In embodiments, the computer readable medium may have code segments executable to determine a cost of reinsurance, and a supplemental insurance coverage amount, as well as code segments executable to perform any one or more of the other disclosed methods or system functions.

The inventors note that the above examples are merely provided for purposes of enhancing understanding of the present disclosure, and should not be considered as limiting. Those having ordinary skill in the art would readily understand that these examples may be extended and that other examples may be substituted for the ones disclosed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of determining an insurance coverage amount for an insurance plan holder having a health insurance plan using a tangible computer processor, the method comprising:
  receiving a contribution payment amount from the insurance plan holder, the contribution payment amount including at least an investment payment portion and a premium payment portion;
  distributing, using the tangible computer processor, the investment payment portion and the premium payment portion between an investment account and a premium account, respectively; and
  determining, after the distributing, the insurance coverage amount based on an amount of funds present in the investment account and a coverage factor for a predetermined time period.

2. The method of claim 1, further comprising:
  determining whether a claim for insurance has been received, the claim for insurance having a claim amount,
  wherein when the claim is received, the amount of funds in the investment account is decreased, and the insurance coverage amount is updated based on a product of the decreased amount of funds and the coverage factor.

3. The method of claim 2, further comprising:
  decreasing the amount of funds in the investment account based on a difference between the amount of funds in the investment account and a deduction factor, the deduction factor being a quotient of the claim amount of the claim and the coverage factor.

4. The method of claim 1, further comprising:
  setting a predetermined coverage indicator for the insurance coverage amount; and
  determining a cost of reinsurance for the predetermined time period based on a difference between the determined insurance coverage amount and the predetermined coverage indicator, the cost of reinsurance being a component of the premium payment portion.

5. The method of claim 4, wherein when the difference between the determined insurance coverage amount and the predetermined coverage indicator decreases between each successive, predetermined time period, alerting an account manager for receiving updates to the health insurance plan to decrease the cost of reinsurance and reduce the premium payment portion due for a subsequent time period.

6. The method of claim 4, wherein when the difference between the determined insurance coverage amount and the predetermined coverage indicator is zero for the predetermined time period, alerting the account manager for receiving updates to the health insurance plan, and
  wherein when the health insurance plan is updated, a reduced contribution payment is received where at least one of the investment payment portion and the premium payment portion is decreased.

7. The method of claim 6, wherein when the reduced contribution payment amount is received for distribution between the investment account and the premium account, a supplemental insurance coverage amount is determined based on an amount of funds present in the investment account and a supplemental coverage factor.

8. The method of claim 1, wherein the coverage factor is variable and based on information received from at least one insurance risk database.

9. The method of claim 1, further comprising:
  receiving in the investment account an interest amount based on the amount of funds in the investment account and a percentage of variable interest for a variable, predetermined time period.

10. The method of claim 4, wherein the predetermined coverage indicator is based on a catastrophic insurance plan, and wherein the catastrophic insurance plan is a rider to the health insurance plan.

11. The method of claim 7, wherein the supplemental coverage factor is variable and based on information received from at least one insurance risk database.

12. A system to determine an insurance coverage amount for an insurance plan holder having a health insurance plan, the system comprising:
  a receiver configured to receive a contribution payment amount from the insurance plan holder in a communication over a communications network, the received contribution payment amount including at least an investment payment portion and a premium payment portion;
  an account data processor that communicates with the receiver and configured to match the received contribution payment amount to the health insurance plan;
  a distributor that communicates with the receiver and the account data processor, and is configured to receive the contribution payment amount and distribute the investment payment portion and the premium payment portion between an investment account and a premium account associated with the health insurance plan, respectively;
  a determining processor that monitors an amount of funds present in the investment account and determines the insurance coverage amount based on the amount of funds present in the investment account and a coverage factor for a predetermined time period; and
  an outputter that displays the determined insurance coverage amount.

13. At least one non-transitory tangible computer readable storage medium that stores a computer program for determining an insurance coverage amount for an insurance plan holder having a health insurance plan, the tangible computer readable storage medium comprising:
  a receiving code segment, recorded on the tangible computer readable storage medium, executable to receive a contribution payment amount from the insurance plan holder in a communication over a communications network, the received contribution payment amount including at least an investment payment portion and a premium payment portion;

a processing code segment processor, recorded on the tangible computer readable storage medium, executable to match the received contribution payment amount to the health insurance plan;

a distributing code segment, recorded on the tangible computer readable storage medium, executable to distribute the investment payment portion and the premium payment portion between an investment account and a premium account, respectively;

a computing code segment, recorded on the tangible computer readable storage medium, executable to determine the insurance coverage amount based on an amount of funds present in the investment account and a coverage factor for a predetermined time period, the coverage factor being; and an output code segment, recorded on the tangible computer readable storage medium, executable to display the determined insurance coverage amount.

* * * * *